United States Patent

Wu

[11] Patent Number: 5,921,120
[45] Date of Patent: Jul. 13, 1999

[54] STEERING WHEEL LOCK ASSEMBLY WITH AIR BAG PROTECTION

[76] Inventor: Wen Chang Wu, No. 5, Hsin 1 Lane, Hsin-Hsing Road, Chiao-Tou Hsiang, Kaohsiung Hsien, Taiwan

[21] Appl. No.: 09/005,835

[22] Filed: Jan. 12, 1998

[51] Int. Cl.⁶ .................................................... B60R 25/02
[52] U.S. Cl. .................................. 70/209; 70/226; 70/237
[58] Field of Search ..................................... 70/14, 18, 19, 70/209–212, 225, 226, 237, 238

[56] References Cited

U.S. PATENT DOCUMENTS

| | | | |
|---|---|---|---|
| 5,457,972 | 10/1995 | Lo | 70/209 |
| 5,595,078 | 1/1997 | Harrell | 70/209 |
| 5,609,050 | 3/1997 | Yu | 70/209 |
| 5,636,537 | 6/1997 | Chen | 70/209 |
| 5,671,619 | 9/1997 | Hou | 70/209 |
| 5,673,577 | 10/1997 | Hileman, Jr. | 70/209 |
| 5,676,001 | 10/1997 | Ho | 70/226 X |
| 5,678,433 | 10/1997 | Riccitllii | 70/209 |
| 5,706,681 | 1/1998 | Gorokhovsky | 70/209 |
| 5,722,270 | 3/1998 | Yu | 70/209 |
| 5,755,124 | 5/1998 | Chang | 70/209 |
| 5,765,415 | 6/1998 | Savinsky | 70/209 |
| 5,782,116 | 7/1998 | Ryan et al. | 70/209 |

Primary Examiner—Suzanne Dino Barrett
Attorney, Agent, or Firm—Watson Cole Grindle Watson, P.L.L.C.

[57] ABSTRACT

A steering lock assembly includes a main body having a recess for receiving a portion of a rim of a steering wheel, a hook device pivotally mounted in the main body and including a hook member for releasably enclosing the recess of the main body to securely hold the portion of the rim of the steering wheel, an air bag protective plate securely attached to the hook means to rotate therewith, and pawls for releasably engaging with ratchet wheels respectively mounted on the hook device and the air bag protective plate. The pawls are biased to engage with the ratchet wheels such that the air bag protective plate is only rotatable in a direction toward the air bag and that the hook member is only rotatable toward the recess of the main body.

3 Claims, 4 Drawing Sheets

STEERING WHEEL LOCK ASSEMBLY WITH AIR BAG PROTECTION

BACKGROUND OF THE INVENTION

1. Field of the Invention

The present invention relates to a steering wheel lock assembly with air bag protection.

2. Description of the Related Art

A wide variety of steering wheel locks have been developed, yet unauthorized access to the air bags still cannot be prevented. The present invention is intended to provide a steering lock assembly with air bag protection.

SUMMARY OF THE INVENTION

A steering lock assembly in accordance with the present invention comprises a main body, a hook means, an air bag protective plate, and a lock means. The main body includes a recess for receiving a portion of a rim of a steering wheel. The main body further includes an end attached to an object to prevent from rotational movement of the steering wheel when the main body is mounted on the steering wheel.

The hook means is pivotally mounted in the main body and includes a hook member for releasably enclosing the recess of the main body to securely hold the portion of the rim of the steering wheel. The hook means includes a first ratchet wheel securely mounted thereon to rotate therewith.

The air bag protective plate is securely attached to the hook means to rotate therewith, and a second ratchet wheel is securely mounted on the air bag protective plate to rotate therewith. The lock means including a lock core, a pawl means for releasably engaging with the ratchet wheels, and means for biasing the pawl means to engage with the ratchet wheels such that the air bag protective plate is only rotatable in a direction toward the air bag and that the hook member is only rotatable toward the recess of the main body.

The air bag protective plate is in a position to prevent from unauthorized access to the air bag when the lock means is in a locked position where the hook member encloses the recess of the main body to securely hold the portion of the rim of the steering wheel. When a proper key is inserted and rotated, the pawl means are disengaged from the ratchet wheels to allow rotational movement of the air bag protective plate away from the air bag and rotational movement of the hook member away from the recess to thereby allow removal of the lock assembly.

An alarm means may be mounted on the air bag protective plate to provide a signal for unauthorized access to the air bag. The lock means may comprise an actuating plate which lifts the pawl means to disengage from the ratchet wheels when the key is caused to rotate in the lock core.

Other objects, advantages, and novel features of the invention will become more apparent from the following detailed description when taken in conjunction with the accompanying drawings.

DESCRIPTION OF THE PREFERRED EMBODIMENT

Figure 1:
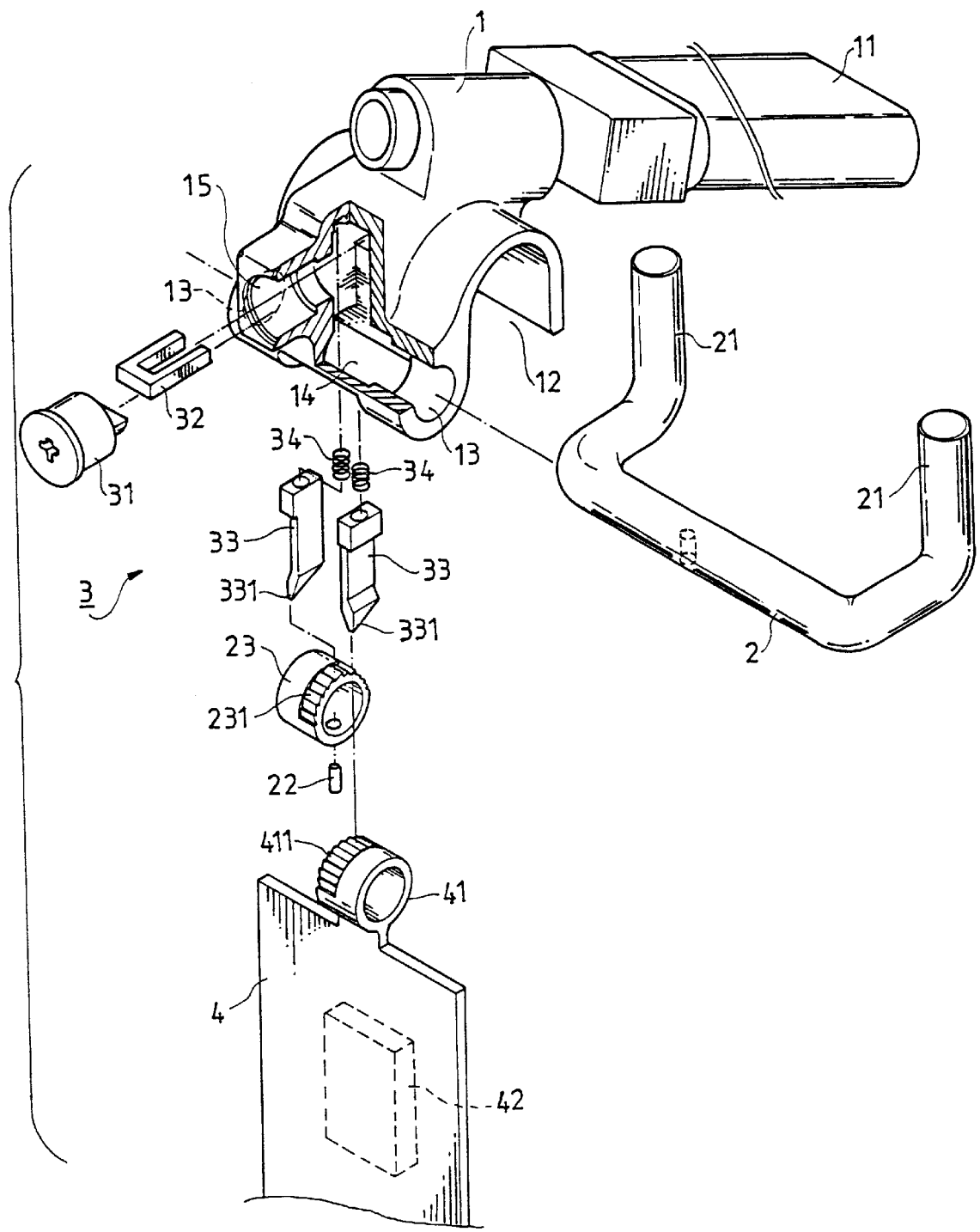
FIG. 1 is an exploded perspective view of a steering wheel lock assembly in accordance with the present invention.
Figure 2:
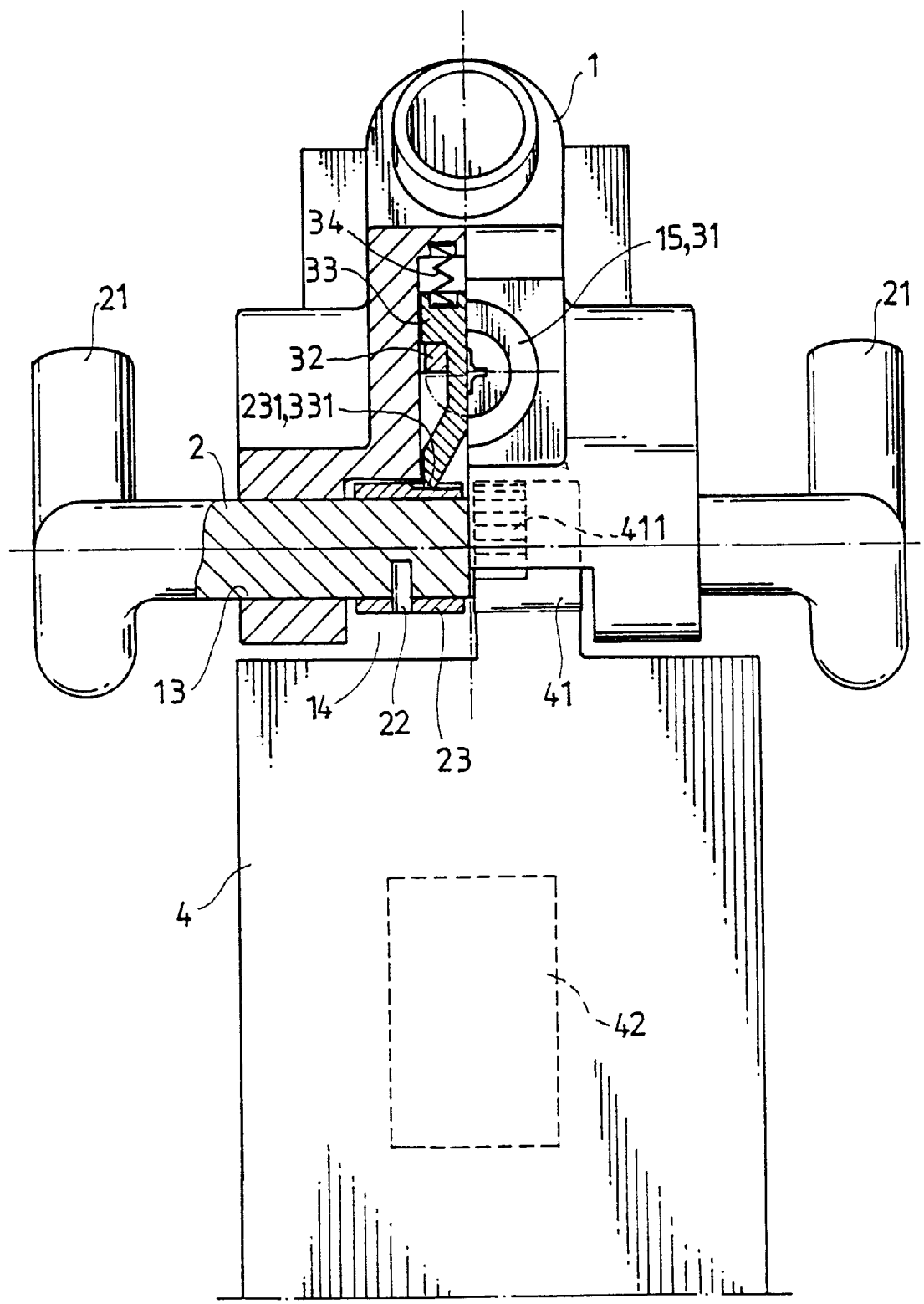
FIG. 2 is a front elevational view, partly sectioned, of the steering wheel lock assembly in accordance with the present invention.
Figure 3:
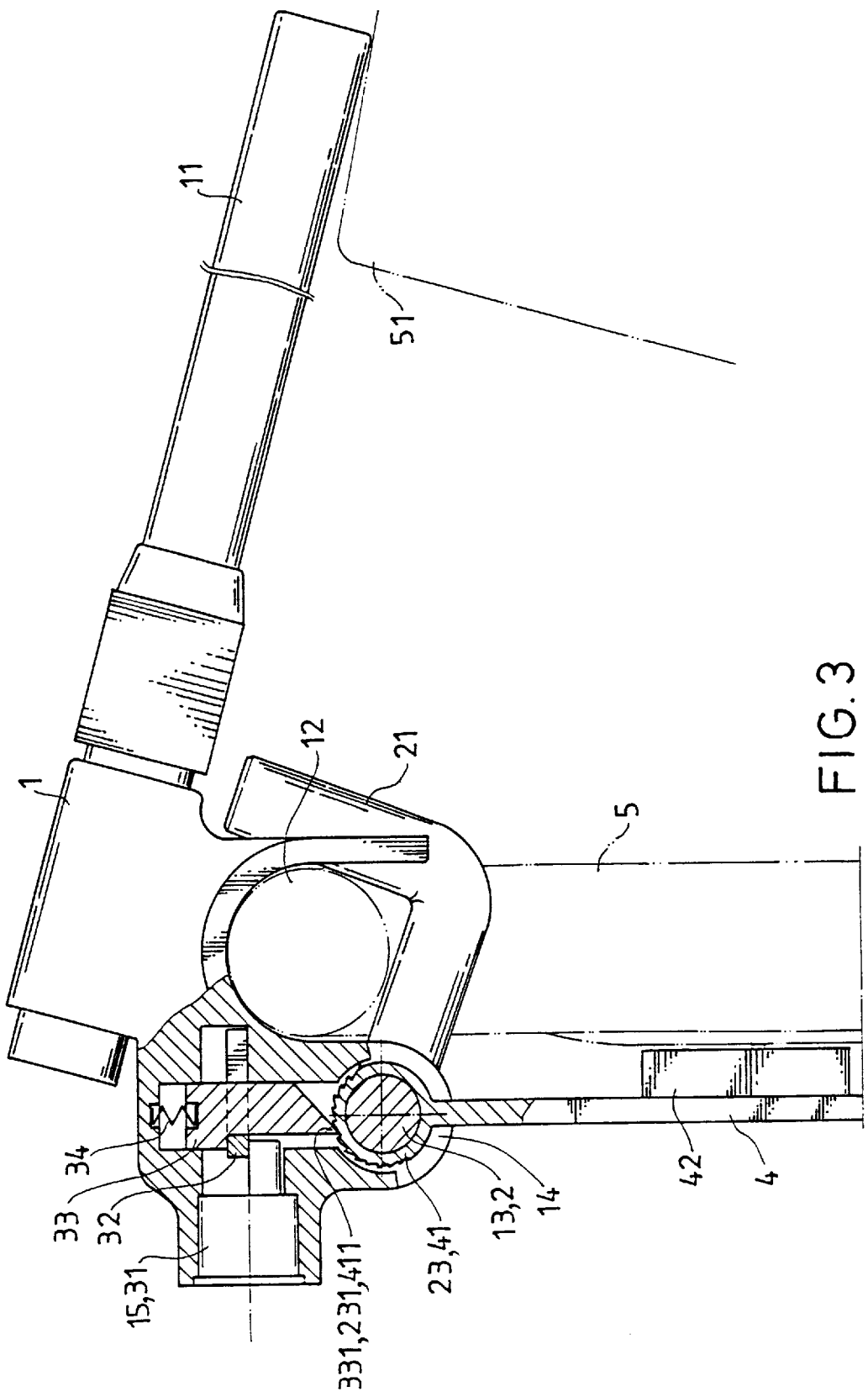
FIG. 3 is a side elevational view, partly sectioned, of the steering lock assembly in accordance with the present invention.

Referring to the drawings and initially to FIGS. 1 to 3, a steering wheel lock assembly in accordance with the present invention generally includes a main body 1, a hook means 2, a lock means 3, and an air bag protective plate 4. The main body 1 is made of rigid material and includes a first end 11 securely attached to, e.g., a dashboard 51 (FIG. 3) to prevent from rotational movement of a steering wheel 5 to which the main body 1 is mounted. The main body 11 includes a recess 12 for fittingly receiving a portion of a rim of the steering wheel 5. The main body 1 further includes a hole 13 for pivotally receiving the hook means 2.

The hook means 2 includes a longitudinal section (not labeled) pivotally received in the hole 13 and two hook members 21 which may enclose the recess to securely hold the portion of the rim of the steering wheel 5, which will be described in detail later. A ratchet wheel 23 having one-way ratchet teeth 231 formed thereon is securely mounted around the longitudinal section of the hook means 2 by a pin 22 to rotate therewith.

The lock means 3 includes a lock core 31 which is mounted in a compartment 15 defined in the main body 1 and operable by a correct key, a pawl means (e.g., two pawls 33 in this embodiment), and an actuating plate 32. The pawls 33 are respectively biased by springs 34 to respectively engage with the ratchet wheel 23 and a second ratchet wheel 41 mounted on top of the air bag protective plate 4 such that the ratchet wheels 23 and 4 are allowed to rotate in a single direction. The second ratchet wheel 41 is received in a hole 14 (preferably in alignment with the hole 13) defined in the main body 1 and includes one-way ratchet teeth 411 formed thereon to achieve the required function. In addition, the second ratchet wheel 41 is securely mounted to the longitudinal section of the hook means 2 to rotate therewith. It is appreciated that the air bag protective plate 4 is made of rigid material to protect the air bag (not shown).

In use, referring to FIGS. 2 and 3, the air bag protective plate 4 is in a position to shield the air bag while the hook members 21 of the hook means 2 enclose the portion of the rim of the steering wheel 5. It is appreciated that the air bag protective plate 4 can be rotated in a direction toward the air bag and that the hook members 21 are only rotatable toward the recess 12 of the main body 1, i.e., rotational movement of the protective plate 4 away from the air bag and rotational movements of the hook members 21 away from the recess 12 are not allowed. This is because the ratchet teeth 231 and 411 of the ratchet wheels 23 and 41 are engaged with the pawls 33 under the action of the springs 34.

Figure 4:
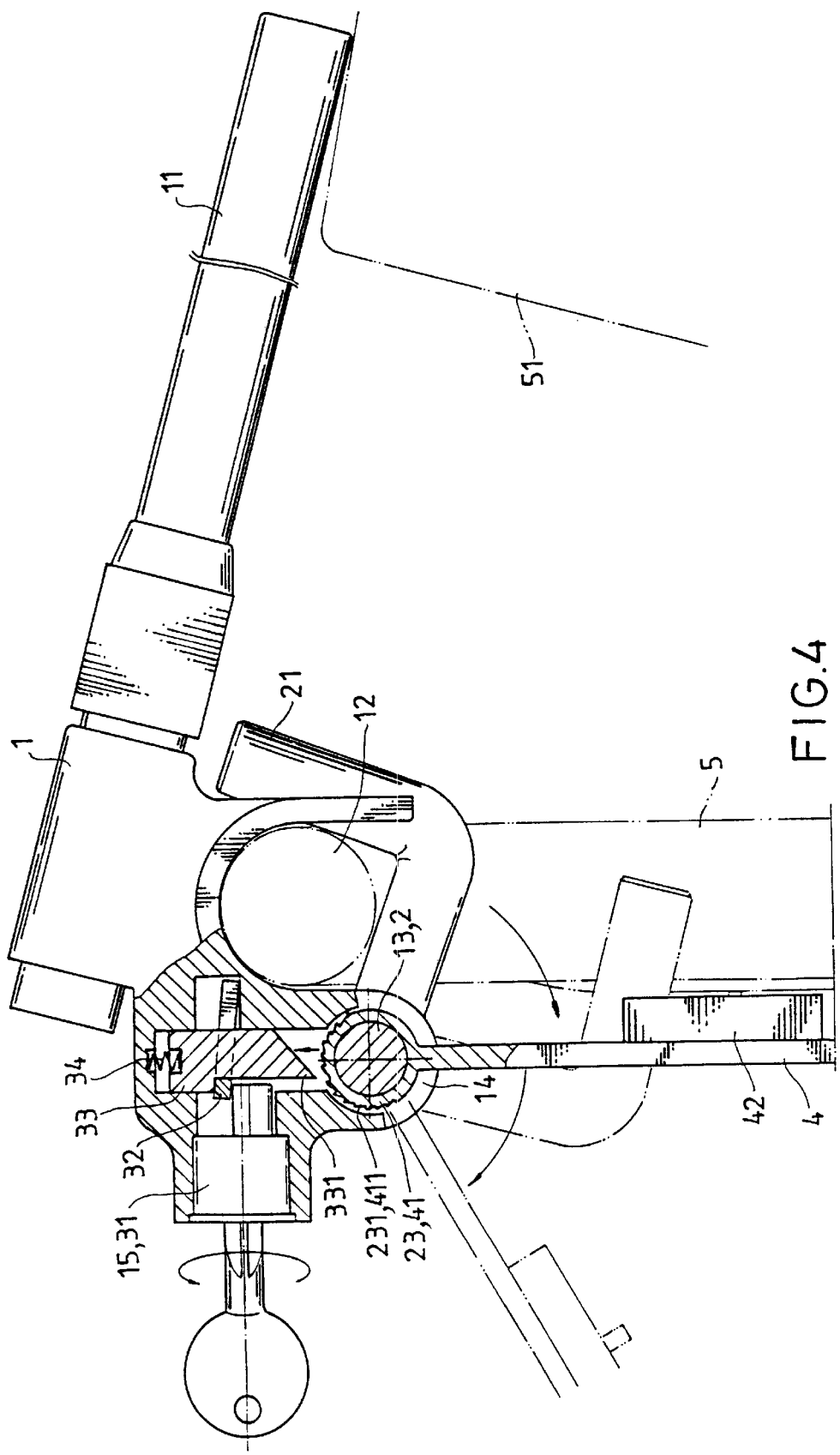
FIG. 4 is a view similar to FIG. 3, illustrating operation of the steering wheel lock assembly.

Referring to FIG. 4, when a proper key is inserted into the lock core 31 and rotated through a predetermined angle, the actuating member 32 is lifted upwardly, which, in turn, lifts the pawls 33 upwardly to compress the springs 34 and to disengage from the ratchet wheels 23 and 41. As a result, the protective plate 4 and the hook means 2 may be rotated to a position shown by the phantom lines to allow removal of the lock assembly. Preferably, the protective plate 4 may have an alarm means 42 provided thereon to provide a signal of unauthorized access of the air bag.

According to the above description, the lock assembly may provide protection to both of the steering wheel and the air bag.

Although the invention has been explained in relation to its preferred embodiment, it is to be understood that many other possible modifications and variations can be made without departing from the spirit and scope of the invention as hereinafter claimed.

What is claimed is:

1. A steering lock assembly, comprising:

a main body including a recess adapted to receive a portion of a rim of a steering wheel, the main body further including an end adapted to be attached to an object to prevent rotational movement of the steering wheel when the main body is mounted on the steering wheel, a hook means pivotally mounted in the main body and including a hook member for releasably enclosing the recess of the main body to securely hold the portion of the rim of the steering wheel, said hook means including a first ratchet wheel securely mounted thereon to rotate therewith, an air bag protective plate having a second ratchet wheel securely attached to the hook means to rotate therewith, and a lock means having a lock core, and a pawl means for releasably engaging with the first and second ratchet wheels, and means for biasing the pawl means to engage with the first and second ratchet wheels such that the air bag protective plate is only rotatable in a direction toward an air bag and that the hook member is only rotatable in the direction toward the recess of the main body, whereby the air bag protective plate is in a position to prevent authorized access to the air bag when the lock means is in a locked position where the hook member encloses the recess of the main body to securely hold the portion of the rim of the steering wheel, and when a proper key is inserted and rotated, the pawl means are disengaged from the ratchet wheels to allow the rotational movement of the air bag protective plate away from the air bag and rotational movement of the hook member away from the recess to thereby allow removal of the lock assembly.

2. The steering wheel lock assembly according to claim 1, further comprising an alarm means mounted on the air bag protective plate.

3. The steering wheel lock assembly according to claim 1, wherein the lock means comprises an actuating plate which lifts the pawl means to disengage from the ratchet wheels when the key is caused to rotate in the lock core.

* * * * *